United States Patent

Masuda et al.

[11] Patent Number: 6,050,473
[45] Date of Patent: Apr. 18, 2000

[54] BRAZING APPARATUS

[75] Inventors: Tsugunori Masuda; Junichi Onozaki; Hiroshi Saito, all of Saitama, Japan

[73] Assignee: Kabushiki Kaisha Tamura Seisa Kusho, Japan

[21] Appl. No.: 09/011,573

[22] PCT Filed: Jun. 10, 1997

[86] PCT No.: PCT/JP97/01983

§ 371 Date: Aug. 10, 1998

§ 102(e) Date: Aug. 10, 1998

[87] PCT Pub. No.: WO97/47423

PCT Pub. Date: Dec. 18, 1997

[30] Foreign Application Priority Data

Jun. 11, 1996 [JP] Japan .................................. 8-149592

[51] Int. Cl.[7] .............................. B23K 1/08; B23K 13/01; B23K 35/12

[52] U.S. Cl. ........................... 228/37; 228/260; 219/603; 219/615

[58] Field of Search ............... 228/37, 260; 219/601, 219/603, 609, 614, 615, 616

[56] References Cited

U.S. PATENT DOCUMENTS

| | | | |
|---|---|---|---|
| 3,797,724 | 3/1974 | Flury et al. ............................. | 228/37 |
| 3,941,088 | 3/1976 | Ronafoldi et al. ...................... | 118/620 |
| 4,392,786 | 7/1983 | Merenkov et al. ..................... | 417/50 |
| 4,568,012 | 2/1986 | Kakuhata et al. ...................... | 228/37 |
| 5,240,169 | 8/1993 | Gileta .................................... | 228/180.1 |
| 5,816,474 | 10/1998 | Flury ..................................... | 228/37 |

*Primary Examiner*—Patrick Ryan
*Assistant Examiner*—Kiley Stoner
*Attorney, Agent, or Firm*—Morrison Law Firm

[57] ABSTRACT

A first electromagnetic induction pump system includes a first plurality of electromagnetic induction pumps, arranged in the direction parallel to the width of workpiece. The first plurality of electromagnetic induction pumps extend vertically along a first vertical plate portion at a workpiece inlet side of a single reservoir. A second electromagnetic induction pump system includes a second plurality of electromagnetic induction pumps, arranged in the direction parallel to the width of workpiece. The second plurality of electromagnetic induction pumps extend vertically extends along a second vertical plate portion at the workpiece outlet side of the reservoir. Brazing filler metal is ejected upward in waves by the electromagnetic induction pump systems to braze workpieces carried by the ejected waves into and out of the device. Using a plurality of electromagnetic induction pumps along the width of the workpiece produces waves which are wide enough to cover the width of workpiece and to have a uniform height.

15 Claims, 9 Drawing Sheets

BRAZING APPARATUS

TECHNICAL FILED

The present invention relates to a brazing apparatus using an electromagnetic induction pump.

BACKGOUND

FIG. 8 shows the general structure of a conventional wave soldering device, wherein a work conveyor 14 adapted to convey workpieces to be soldered, such as component-mounted substrates or the like, extends from a workpiece inlet 12 to a workpiece outlet 13 of a device cover 11.

A fluxer 15 for applying foamed flux to workpieces, a preheater 16 for preheating the workpieces, a solder bath 17 for soldering the workpieces by using molten solder ejected from wave nozzles, and a fan 18 for cooling the workpieces after soldering are arranged in this order along the conveyor 14.

A primary wave nozzle 21a and a secondary wave nozzle 21b are disposed in the solder bath 17. A wave-forming plate 22 has numerous ejection holes is provided at the open top of the primary wave nozzle 21a. The primary wave nozzle 21a is adapted to feed molten solder over the entire workpiece, covering every corner of the electrode portions and other parts of chip components by means of numerous small primary waves W1 which are ejected as irregular spouts from the ejection holes of the wave-forming plate 22. The secondary wave nozzle 21b is adapted to adjust the shapes of soldered parts by means of gentle secondary waves W2.

As shown in FIG. 9, the solder bath 17 is provided with a pressure duct 23 fitted in an opening at the bottom of the nozzle body 21 of the wave nozzles 21a,21b, and a pump impeller 24 disposed at the end of the pressure duct 23. The solder bath 17 also includes a suction opening 25 and a motor drive mechanism 26 associated with the pump impeller 24.

Molten solder introduced from the suction opening 25 as a result of rotation of the pump impeller 24 is fed under pressure through the pressure duct 23 into the nozzle body 21 and emitted from the nozzle body 21 in waves so that the undersides of workpieces P, which may be component-mounted substrates, are soldered while they are conveyed, being held between conveyor claws 27 of the conveyor 14. The major part of the solder waves directly returns onto the molten solder surface 28 in the solder bath 17 and is circulated into the suction opening 25 of the pump impeller 24.

Various brazing apparatuses using an electromagnetic pump are disclosed in, for example, Japanese Patent Publication Nos. 42590-1976, 31628-1990 and 60581-1991, and Japanese Utility Model Publication No. 17572-1988. Electromagnetic pumps used in those brazing apparatuses are either a direct current type or an alternating current type.

A direct-current type electromagnetic pump is adapted to generate a thrusting force to a conductive brazing filler metal, such as tin, over its path of motion by applying a magnetic field perpendicularly to the path of the conductive brazing filler metal and feeding direct electric current perpendicularly to both the path of motion and the magnetic field.

An alternating-current type electromagnetic pump is an electromagnetic induction pump which includes induction coils arranged on a plane along a path traveled by a conductive brazing filler metal and is adapted to generate a thrusting force to the brazing filler metal by feeding AC current having lagged phases to the induction coils, thereby generating a shifting magnetic field in the path traveled by the conductive brazing filler metal to permit the electromagnetic induction to generate electromotive force on the conductive brazing filler metal in its path of motion so that electric current generated by the electromotive force of the brazing filler metal flows in the magnetic flux in the magnetic field.

With a wave soldering device of a type which calls for force-feeding molten solder by means of a pump impeller rotated by a conventional motor drive mechanism, it is difficult to reduce the amount of solder, because of structural limitations in how small the solder bath can be.

To be more precise, as shown in FIG. 9, it is necessary to ensure sufficient width to provide sufficient clearance for the width of workpiece, i. e. the length of the workpieces perpendicular to their conveyance path, along the motor drive mechanism 26 to the nozzle body 21. In addition, the solder bath 17 has to be sufficiently deep in order to prevent oxidized solder from being entangled in the portion where the impeller is turning. The volume of the entire solder bath 17 becomes large.

The conventional configuration presents another problem in that heights of solder waves tend to become uneven with respect to the direction parallel to the width of workpiece, because, as shown in FIG. 9, molten solder introduced from the suction opening 25 below the pump impeller 24 is discharged upward while being moved in the direction parallel to the width of workpiece by means of the pressure duct 23.

On the other hand, a conventional brazing apparatus which calls for force-feeding brazing filler metal by using an electromagnetic pump and ejecting it in the form of waves requires less brazing filler metal compared with the wave soldering device described above. Because of the capacity of the electromagnetic pump, however, it is not easy to increase the size of the discharge opening in the direction parallel to the width of workpiece.

Furthermore, as a conventional electromagnetic pump-type brazing apparatus described above has a structure which requires a considerable space along the conveyance path of workpieces, it is difficult to arrange a plurality of devices along the width of workpiece in order to cope with wide workpieces.

That is, simply arranging two conventional electromagnetic pump type brazing apparatuses along the width of workpiece would not only double the surface area of the device, which would take up too much space, but would also require twice as much brazing filler metal.

Due to environmental protection regulations, the demands for brazing filler metal which does not contain lead (what is generally called lead-free solder) are recently on the increase. As lead-free solders are made of materials such as indium or the like, which are 3 to 10 times as expensive as ordinary solder made of tin and lead, it is necessary to reduce the quantity of the brazing filler metal to be used as much as possible.

OBJECTS AND SUMMARY OF THE INVENTION

In order to solve the above problems, an object of the present invention is to provide an electromagnetic pump type brazing apparatus adapted to form waves which are capable of coping with workpieces having a great width. Another object of the present invention is to provide an electromagnetic pump type brazing apparatus which is capable of reducing the quantity of brazing filler metal.

A brazing apparatus according to the invention includes a reservoir having vertically extending plate-shaped vertical plate portions and adapted to contain brazing filler metal, and a plurality of electromagnetic induction pumps adapted to braze workpieces by ejecting upward the brazing filler metal contained in the reservoir, said electromagnetic induction pumps extending along vertical plate portions of the reservoir and arranged in such a direction as to intersect the predetermined path of conveyance of workpieces.

With the configuration as above, the electromagnetic induction pumps arranged in such a direction as to intersect the predetermined path of conveyance of workpieces are ensured to provide waves which are wide enough to cover the width of workpiece and have a uniform height.

According to another feature of the invention, a plurality of electromagnetic induction pumps of a brazing apparatus are associated with a single reservoir.

As a single reservoir is shared by a plurality of electromagnetic induction pumps in the manner described above, the reservoir can be formed compact, and the quantity of the brazing filler metal in the reservoir can be reduced.

According to another feature of the invention, each electromagnetic induction pump of a brazing apparatus comprises a first iron core disposed in close contact with the outer side face of a vertical plate portion, an induction coil wound around the first iron core, a second iron core disposed in parallel to the inner side face of the vertical plate portion, and a brazing filler metal rising gap provided between the vertical plate portion and the second iron core.

As the first iron cores around which the induction coils are wound are disposed outside the vertical plate portions of the reservoir, maintenance of the induction coils or a similar operation can be easily done from the outside.

According to yet another feature of the invention, while each electromagnetic induction pump of the brazing apparatus is individually provided with a first iron core and a second iron core, an induction coil is so disposed as to be commonly used by a plurality of first iron cores.

With the configuration as above, an electromagnetic induction pump at one side and an electromagnetic induction pump at the other side can be operated together at appropriate proportions by means of a common induction coil.

According to yet another feature of the invention, each electromagnetic induction pump of the brazing apparatus is individually provided with a first iron core, a second iron core and an induction coil.

With the configuration as above, energy can be saved by shutting the electromagnetic induction pump at either side when handling workpieces which have a small width.

DETAILED DESCRIPTION OF THE PREFERRED EMBODIMENT

Figure 3:
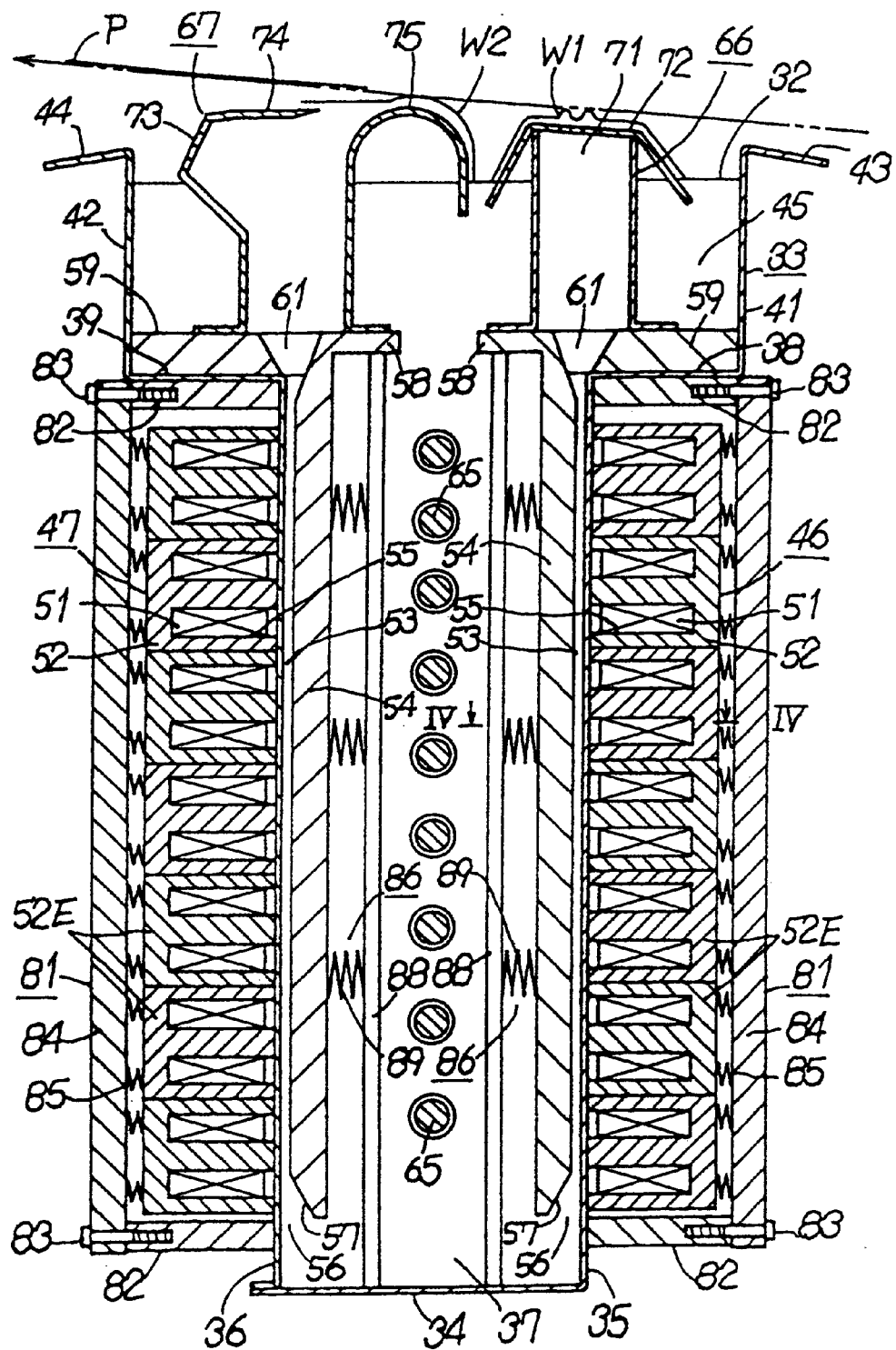
FIG. 3 is a sectional view taken on line III—III of FIG. 1.

As shown in FIG. 3, a single reservoir 33 adapted to contain conductive brazing filler metal 32, which may be tin, indium or the like, is provided. The reservoir 33 comprises a pump reservoir portion 37 and a wave forming reservoir portion 45. The pump reservoir portion 37 is comprised of a bottom plate portion 34, vertical plate portions 35,36 respectively located at the bottom of the workpiece inlet side and at the bottom of the workpiece outlet side, and vertical plate portions (not shown) which are located at the lateral sides of the reservoir with respect to the direction in which workpieces are conveyed. The wave forming reservoir portion 45 is comprised of horizontal plate portions 38,39 which are respectively located at the upper portions of the workpiece inlet side and the workpiece outlet side, vertical plate portions 41,42, upper rim portions 43,44, and vertical plate portions (not shown) which are located at the lateral sides of the reservoir with respect to the direction in which workpieces are conveyed. Each vertical plate portion mentioned above is a vertically extending plate-shaped member.

Disposed in the single reservoir 33 are a first electromagnetic induction pump system 46 and a second electromagnetic induction pump system 47, the first electromagnetic induction pump system 46 extending in the vertical direction along the vertical plate portion 35 at the workpiece inlet side of the reservoir 33, and the second electromagnetic induction pump system 47 extending in the vertical direction along the vertical plate portion 36 at the workpiece outlet side of the reservoir 33.

The first electromagnetic induction pump system 46 is formed by disposing first iron cores 52, around which an induction coil 51 is wound, in close contact with the outer surface of the vertical plate portion 35 at the workpiece inlet side in the reservoir 33 and disposing second iron cores 54 at the inner side of the vertical plate portion 35 in such a manner as to extend parallel to the vertical plate portion 35 with a brazing filler metal gap 53 between each second iron core 54 and the vertical plate portion 35. The second electromagnetic induction pump system 47 is likewise formed by disposing first iron cores 52, around which induction coils 51 are wound, in close contact with the outer surface of the vertical plate portion 36 at the workpiece outlet side in the reservoir 33 and disposing second iron cores 54 at the inner side of the vertical plate portion 36 in such a manner as to extend parallel to the vertical plate portion 36 with a brazing filler metal gap 53 between each second iron core 54 and the vertical plate portion 36.

Each one of the first iron cores 52 disposed at the workpiece inlet side and the workpiece outlet side consists of E-shaped iron cores 52E (FIG. 4), which are vertically arranged so that numerous grooves 55 open toward the associated vertical plate portion 35 or 36 face the respective grooves 55 of the opposite iron core 52, and the induction coil 51 is placed in these grooves 55 and extends along the grooves in the state it is wound around, at appropriate intervals, the extended portions of these grooves. Each E-shaped iron core 52E is formed by stacking numerous thin, E-shaped iron plates in the widthwise direction (as viewed in FIG. 3, the direction perpendicularly intersecting the sheet of the drawing).

Each E-shaped iron core 52E is tightly pressed against the outer surface of the reservoir 33 by a first iron core pushing mechanism 81 in order to prevent a decrease in efficiency of electromagnetic induction at the first iron core.

The first iron core pushing mechanism 81 comprises mounting plates 82 solidly affixed to the upper and lower parts of the reservoir 33, a spring receiving plate 84 extending between each pair of upper and lower mounting plates 82 and integrally affixed thereto by means of screws 83, and spring coil members 85, such as compression coil springs, disposed between the spring receiving plate 84 and the E-shaped iron cores 52E.

Each second iron core 54 is an I-shaped iron core, which is formed by stacking numerous thin, I-shaped iron plates in the widthwise direction (the direction perpendicularly intersecting the sheet of FIG. 3), and includes a slanted face portion 57, nozzle mount portions 58,59 and a discharge opening 61 which opens upward. The slanted face portion 57, which forms a suction opening 56, is located at the bottom of the iron core. The nozzle mount portions 58,59 are integrally formed at the top of the iron core. The discharge opening 61 is formed at the base of the mount portion 59.

Each brazing filler metal rising gap 53 shown in FIG. 3 is formed by disposing spacers 62 (shown in FIG. 4) between a second iron core 54, which is in the shape of a flat plate, and the vertical plate portion 35 or 36 which is associated with second iron core 54.

Figure 4:
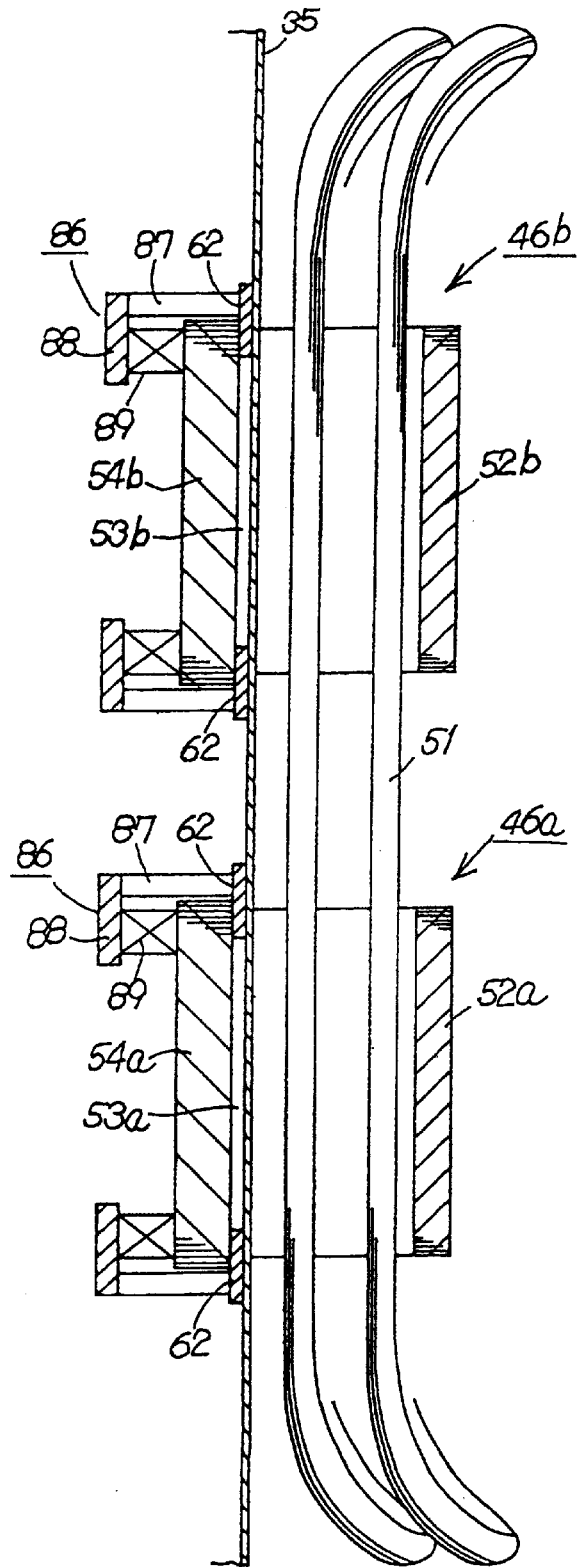
FIG. 4 is a sectional view taken on line IV—IV of FIG. 3.

As shown in FIG. 3 or FIG. 4, each second iron core 54 is tightly pressed against the spacers 62 along the entire length of the second iron core 54 by a second iron core pushing mechanism 86 in order to prevent a decrease in efficiency of electromagnetic induction at the second iron core.

Each second iron core pushing mechanism 86 is formed by integrally affixing spacers 62, mounting plates 87 and spring receiving plates 88 to the associated vertical plate portion 35 or 36, and inserting, from above, a second iron core 54 and springs 89 solidly attached to the second iron core 54 into the space between the spacers 62 and the spring receiving plates 88, said spaces 62, mounting plates 87 and spring receiving plates 88 affixed to the vertical plate portion 35 or 36 by means of welding the spacers to the vertical plate portion, welding the mounting plates 87 to the spacers, and welding the spring receiving plates 88 to the mounting plates. The springs 89 mentioned above may be compression coil springs, leaf springs or the like.

As described above, although the spacers 62 and spring receiving plates 88 are welded to the associated vertical plate portion 35 or 36 of the reservoir 33, the second iron core 54 is inserted from above between the spacers 62 and the spring receiving plates 88 together with the springs 89 attached to the second iron core 54. Then, by engaging the nozzle mount 59 of the second iron core 54 with the horizontal plate portion 38 of the reservoir 33, the second iron core 54 is removably disposed in the reservoir 33.

In other words, each second iron core 54 is mounted in such a manner that it can be removed upward whenever necessary for maintenance or other purpose.

Referring again to FIG. 3, a plurality of heaters 65 for melting brazing filler metal 32 are vertically arranged at the middle of the pump reservoir portion 37 of the reservoir 33, halfway between the first electromagnetic induction pump system 46 and the second electromagnetic induction pump system 47. These heaters 65 are sheathed type heaters elongated in the widthwise direction (as viewed in FIG. 3, the direction perpendicularly intersecting the sheet of the drawing).

A first nozzle 66 and a second nozzle 67 adapted to eject the brazing filler metal 32 are disposed, respectively above the first electromagnetic induction pump system 46 and the second electromagnetic induction pump system 47.

To be more specific, the first nozzle 66 is mounted on the nozzle mounts 58,59 which are integrally formed with the upper ends of the second iron cores 54 at the workpiece inlet side, and the second nozzle 66 is mounted on the nozzle mounts 58,59 which are integrally formed with the upper ends of the second iron cores 54 at the workpiece outlet side.

The first nozzle 66 is provided with a wave-forming plate 72 attached to an aperture 71 at the top of the first nozzle 66, the wave-forming plate 72 including a large number of ejection holes bored therein in order to form numerous primary waves W1 to be spouted in the shape of protrusions which will move irregularly.

The second nozzle 67 is adapted to form smooth secondary waves W2 by means of a directing plate 73 bent in the direction opposite the direction in which workpieces P are conveyed, a directing fin 74 projecting from the tip of the directing plate 73 in the direction opposite the conveyance direction, and a guide plate 75 having a cross section in the shape of the inverted U and attached to the opposite side of the nozzle.

Figure 1:
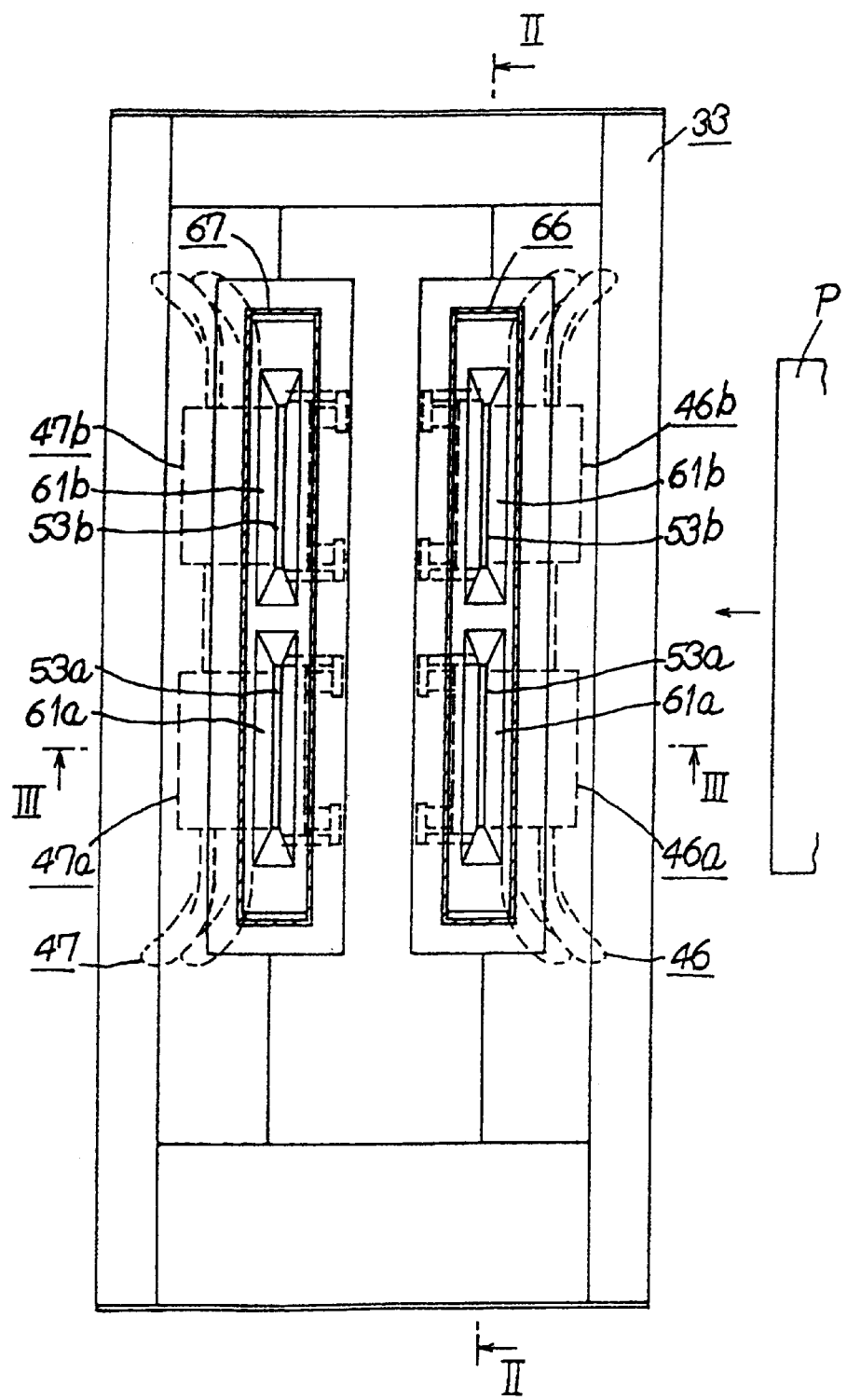
FIG. 1 is a top view of a brazing apparatus according to an embodiment of the invention.

As shown in FIG. 1, the first electromagnetic induction pump system 46 vertically extending along the vertical plate portion 35 at the workpiece inlet side of the reservoir 33 consists of a pair of electromagnetic induction pumps 46a, 46b which are laterally arranged so as to extend in the direction orthogonally intersecting the predetermined path of conveyance workpiece P. In other words, they are arranged along the width of workpiece. The second electromagnetic induction pump system 47 vertically extending along the vertical plate portion 36 at the workpiece outlet side of the reservoir 33 consists of a pair of electromagnetic induction pumps 47a,47b which are laterally arranged in the direction parallel to the width of workpiece P.

As shown in FIG. 4, both the first electromagnetic induction pump system 46 and the second electromagnetic induction pump system 47 have separately formed first iron cores 52a and second iron cores 54a located at one side and first iron cores 52b and second iron cores 54b located at the other side. However, the first iron core 52a at the one side and the first iron core 52b at the other side share the same induction coil 51.

In other words, by means of a common induction coils 51, the electromagnetic induction pumps at the workpiece inlet side, i. e. the electromagnetic induction pump 46a at the one side and the electromagnetic induction pump 46b at the other side, are moved together, and the electromagnetic induction pumps at the workpiece outlet side, i. e. the electromagnetic induction pump 47a at the one side and the electromagnetic induction pump 47b at the other side, are moved together by means of another common induction coil 51.

Figure 2:
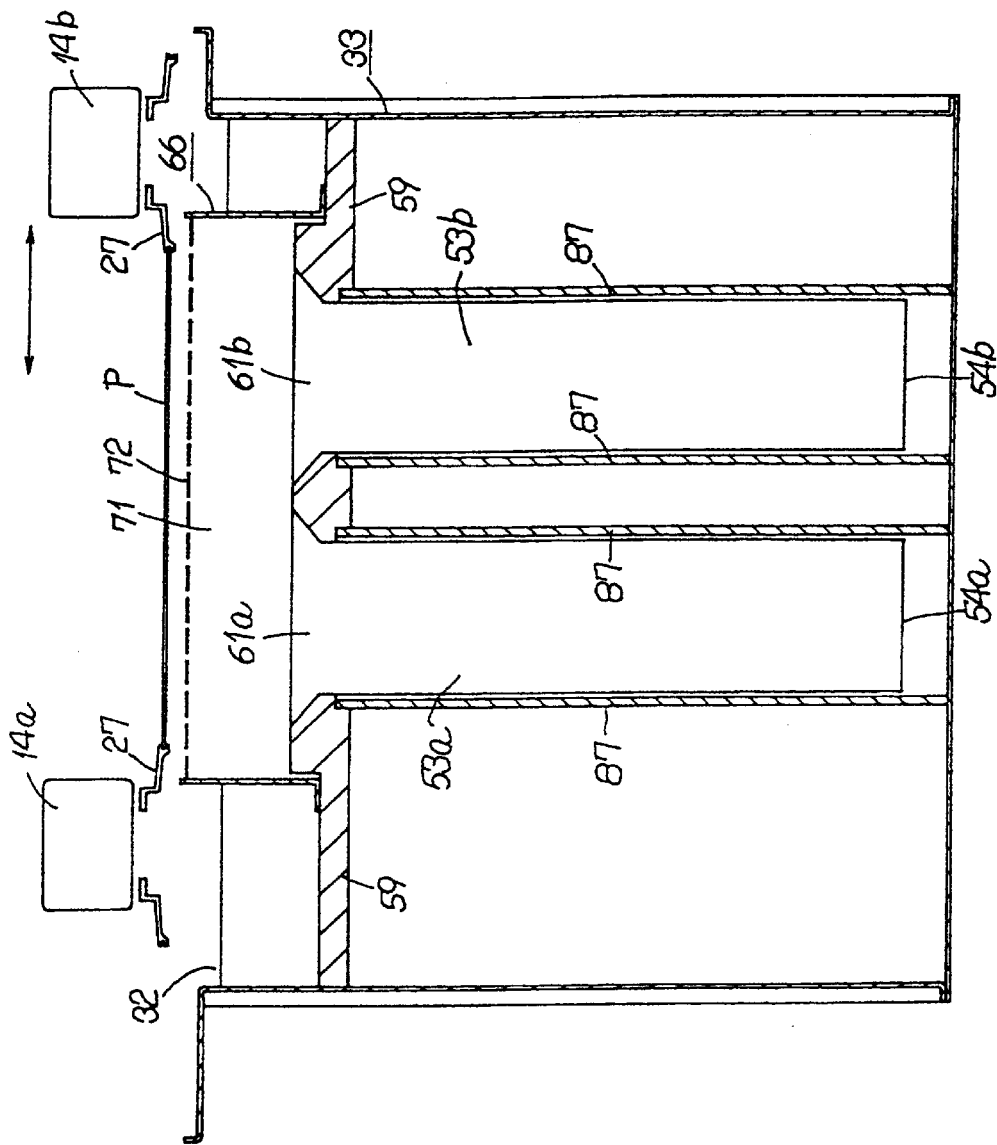
FIG. 2 is a sectional view taken on line II—II of FIG. 1.

As shown in FIG. 2 or FIG. 4, each set of brazing filler metal rising gaps 53 consists of a pair of brazing filler metal rising gaps 53a,53b which are laterally arranged in the direction parallel to the width of workpiece. Furthermore, as shown in FIG. 1 or FIG. 2, each set of discharge openings 61 consists of a pair of discharge openings 61a,61b which are laterally arranged in the direction parallel to the width of workpiece.

As the four edges of the aperture of each one of the discharge openings 61a,61b are so formed as to flare upward, molten metal is ensured to spread smoothly and evenly in four directions when it moves from the brazing filler metal rising gaps 53a,53b, which have a relatively small cross section, to the nozzle 66 or 67 having a relatively large cross section.

As shown in FIG. 1 or FIG. 2, the first nozzle 66 at the workpiece inlet side consists of a single nozzle which is provided in such a manner as to enclose the two laterally arranged discharge openings 61a,61b at the workpiece inlet side. In the same manner as above, the second nozzle 67 at the workpiece outlet side consists of a single nozzle which is provided in such a manner as to enclose the two laterally arranged discharge openings 61a,61b at the workpiece outlet side.

The nozzle 66 or 67 has a depth sufficient to make the pressure of the molten brazing filler metal uniform so that waves emitted from the nozzle 66 or 67 have a uniform height along the entire width of workpiece.

Thus, either pair of electromagnetic induction pumps arranged in the direction parallel to the width of workpiece, i. e. the laterally arranged electromagnetic induction pumps 46a,46 or the laterally arranged electromagnetic induction pumps 47a,47b, ensure that waves having a uniform height and a sufficient dimension to cover the entire width of workpieces are formed.

Next, the function of the embodiment shown in FIGS. 1 through 4 is explained hereunder.

The first and second electromagnetic induction pump systems 46,47 supply AC current having lagged phases, such as three-phase AC current, to the induction coils 51 which are vertically arranged along the brazing filler metal rising gaps 53, thereby generating shifting magnetic fields in the respective brazing filler metal rising gaps 53 so that the electromagnetic induction generates electromotive force on the conductive brazing filler metal in the brazing filler metal rising gaps 53. As a result, electric current generated by the electromotive force of the brazing filler metal flows in the magnetic flux in each magnetic field and thereby generates upward thrusting force on the brazing filler metal 32 so that the brazing filler metal moves upward.

The brazing filler metal 32 is melted by the common heaters 65 and introduced through the suction openings 56 by the respective electromagnetic induction pumps 46,47, and moved up the brazing filler metal rising gaps 53 along the vertical plate portions 35,36, which are respectively located at the workpiece inlet side and the outlet side of the reservoir 33. The brazing filler metal 32 is then discharged from the discharge openings 61 and emitted through the first nozzle 66 and the second nozzle 67 as the primary wave W1 and the secondary wave W2 respectively. Then, after brazing components onto the surfaces of the substrates of the workpiece P carried into and out of the waves, the brazing filler metal 32 falls back into the wave forming reservoir portion 45 and circulates into the pump reservoir portion 37.

Each brazing filler metal rising gaps 53 is so formed as to extend upward in a straight line, without a bent portion. Furthermore, the brazing filler metal rising gaps 53a,53b of the electromagnetic induction pumps 46a,46b or 47a,47b are arranged along the width of workpiece, i. e. in the direction perpendicular to the predetermined conveyance path of workpieces P, and the laterally arranged pair of discharge openings 61a,61b are enclosed by the nozzle 66 or 67 which is commonly associated therewith. The above configuration ensures the formation of primary waves W1 or secondary waves W2 that have a width sufficient to cover the entire width of workpieces and a wave-height distribution which is uniform along the entire width of the nozzle. Therefore, the embodiment described above can easily cope with considerably wide workpieces P, which are difficult to handle by a conventional device having only a single discharge opening 61a.

The primary waves W1, which are in the shape of small protrusions moving in an irregular fashion, are capable of entering into every gap of micro components packaged on a substrate with a high density, ensuring excellent wettability of every brazed portion, while smooth, arc-shaped secondary waves W2 flowing counter to the direction of the conveyance of the substrates smooth out excessive brazing, thereby preventing defects such as so-called bridges, icicles, etc.

Both the first and second nozzles 66,67 can be removed, together with their second iron cores 54, from the reservoir 33 in order to conduct maintenance of the nozzles 66,67 themselves or clean the interiors of the brazing filler metal rising gaps 53 of the electromagnetic induction pump systems 46,47.

As the brazing filler metal rising gaps 53 extending from the suction openings 56 to the discharge openings 61 of the second iron cores 54 associated with respective nozzles can be disassembled by removing the second iron cores 54 upward together with the associated first nozzle 66 or the second nozzle 67, maintenance work, such as, in particular, removal of oxides or other substances lodged in the suction openings 56, is easy.

Providing the suction openings 56 near the bottom plate portion 34 at a sufficient distance from the surface of the brazing filler metal 32, where oxides or other substances are floating, has an advantage in that oxides or other foreign substances will not easily be sucked into the suction openings 56 by accident. Even if oxides or other substances become lodged in a suction opening 56, they can be easily removed by taking the brazing filler metal rising gaps 53 apart as described above.

Furthermore, as the brazing filler metal 32 in a brazing filler metal rising gap 53 can be moved in the reverse direction, i. e. downward, by reversing the phase of the three-phase AC current fed to the induction coil 51, oxide or other substances caught in a suction opening 56 can be easily removed by means of back washing using the brazing filler metal which is ejected backward.

Figure 5:
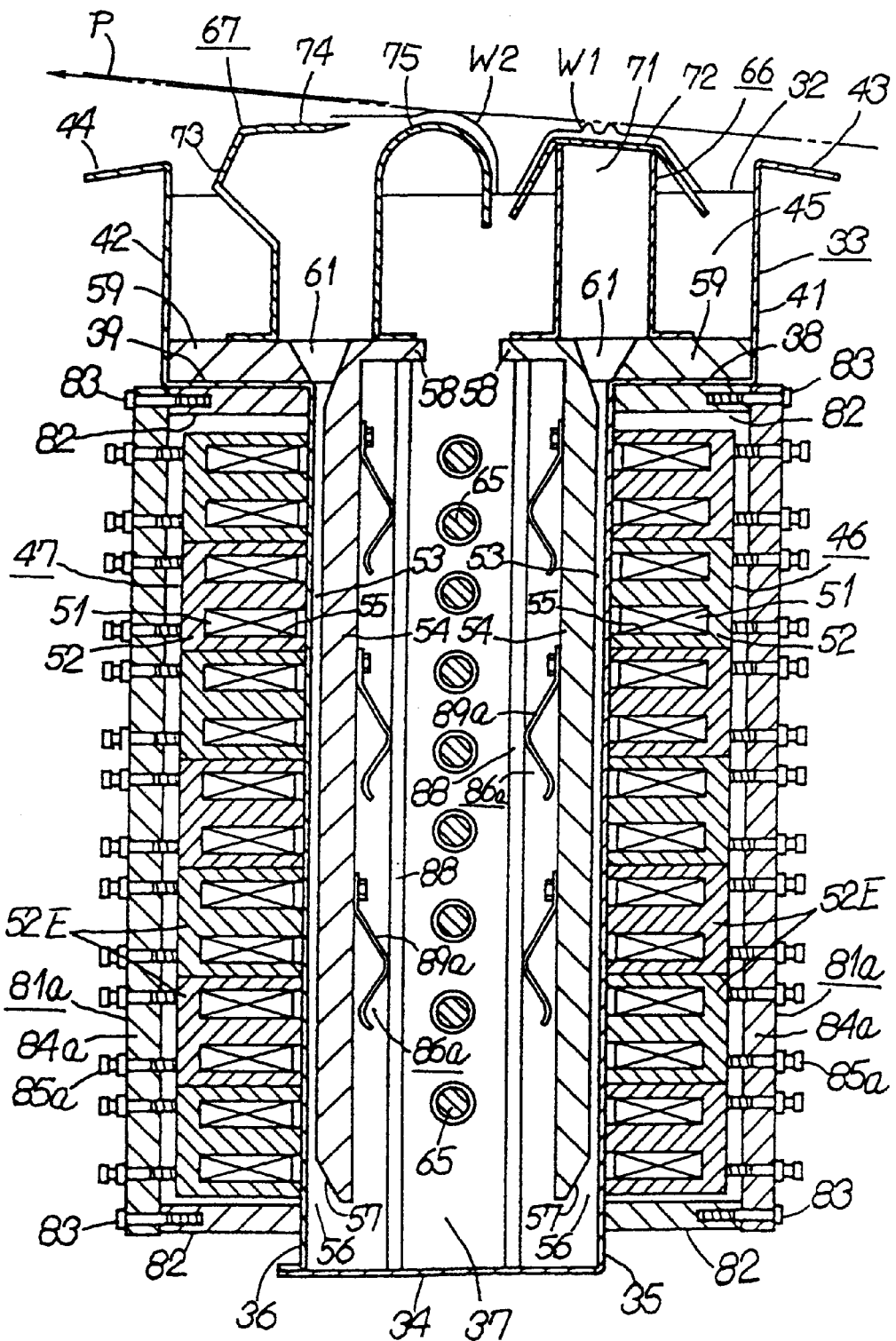
FIG. 5 is a sectional view of a brazing apparatus according to another embodiment of the invention.

Next, FIG. 5 shows a brazing apparatus according to another embodiment of the present invention, which includes first iron core pushing mechanisms 81a and second iron core pushing mechanisms 86a different from those of the embodiment shown in FIG. 3. The elements similar to those of the embodiment shown in FIG. 3 are identified with the same reference numerals, explanation of which is omitted hereunder.

Each first iron core pushing mechanism 81a comprises mounting plates 82 solidly affixed to the upper and lower parts of the vertical plate portion 35 or 36 of the reservoir 33, a screw plate 84a extending between the upper and lower mounting plates 82 and integrally affixed thereto by means of screws 83, and screws 85a screwed through the screw plate 84a, wherein the tips of the screws 85a push the rear ends of the E-shaped iron cores 52E so that the front ends of the extended portions of the E-shaped iron cores 52E are in close contact with the vertical plate portion 35 or 36 of the reservoir 33.

Each second iron core pushing mechanism 86a includes leaf springs 89a having a shape of a wide, inverted V, and respectively fastened at their upper ends to the associated second iron core 54 by means of screws, wherein the leaf springs 89a are inserted, together with the second iron core 54, between the spacers 62 (shown in FIG. 4) and the spring receiving plate 88. The inverted-V-shaped springs 89a mentioned above has such a shape as to be easy to slide on a member to be contact therewith when the associated second iron core 54 is removed upward or inserted downward when conducting a maintenance operation.

Figure 6:
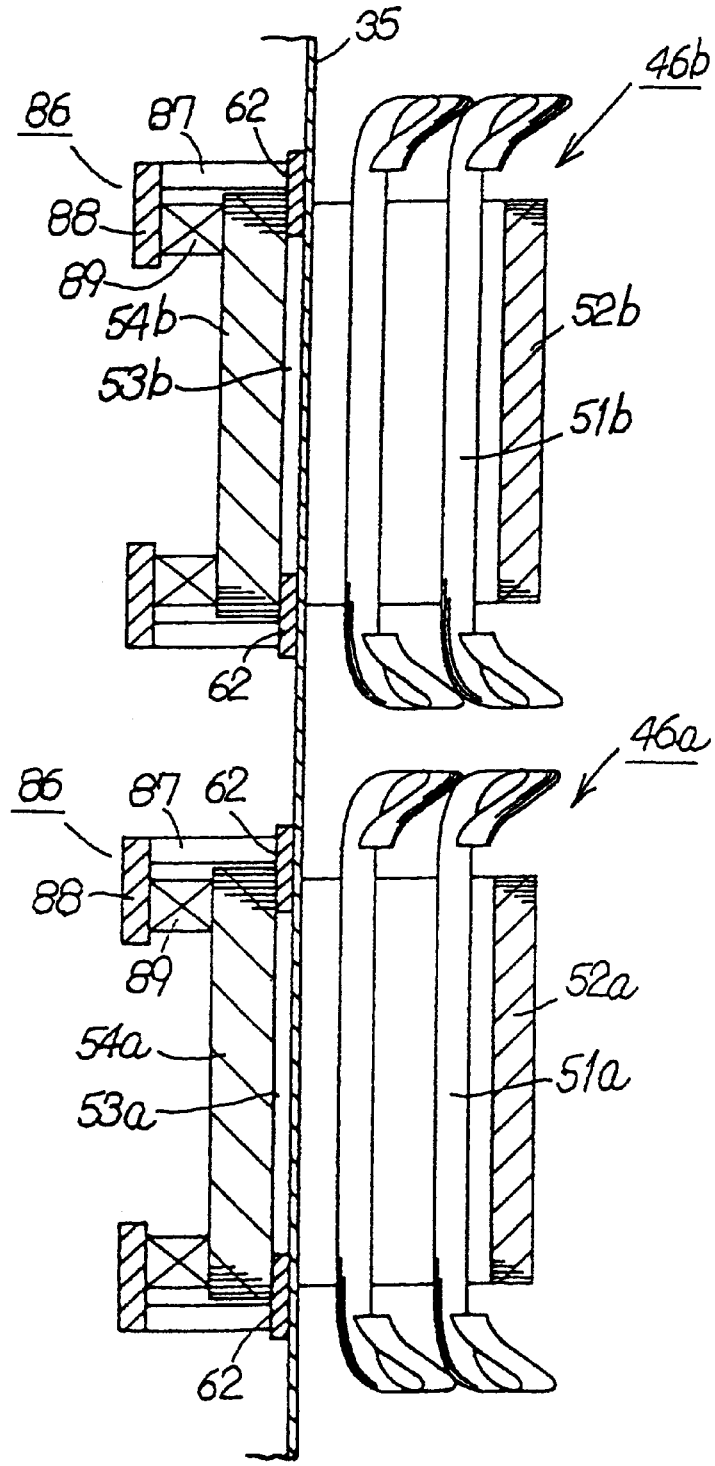
FIG. 6 is a sectional view of electromagnetic induction pumps according to yet another embodiment of the invention.

Next, FIG. 6 shows an embodiment wherein a pair of electromagnetic induction pumps located at the workpiece inlet side, i. e. the electromagnetic induction pump 46a at one side and the electromagnetic induction pump 46b at the other side, or a pair of electromagnetic induction pumps located at the workpiece outlet side, i. e. the electromagnetic induction pump 47a at one side and the electromagnetic induction pump 47b at the other side, are formed of separate first iron cores 52a,52b, second iron cores 54a,54b and induction coils 51a,51b. The elements similar to those of the embodiment shown in FIG. 4 are identified with the same reference numerals, explanation of which is omitted hereunder.

In cases where the conveyor rail 14b, which can be moved in the direction parallel to the width of workpiece, is moved closer to the conveyor rail 14a that is immovably attached as shown in FIG. 2 in order to cope with narrower workpieces, the electromagnetic induction pumps at either side, for example, the electromagnetic induction pumps 46b,47b may be shut down by cutting electricity to the induction coil 51b at the corresponding side.

Although the brazing filler metal rising gaps 53 are so formed as to extend vertically according to the embodiments described above, they may be slightly angled as long as they extend nearly vertically.

According to the embodiment shown in FIG. 1, a plurality of electromagnetic induction pumps 46a,46b at the workpiece inlet side and a plurality of electromagnetic induction pumps 47a,47b at the workpiece outlet side are arranged along the width of workpiece, in other words in the direction perpendicularly intersecting the conveyance path of the workpiece P. However, the present invention is not limited to the structure of this embodiment.

Figure 7:
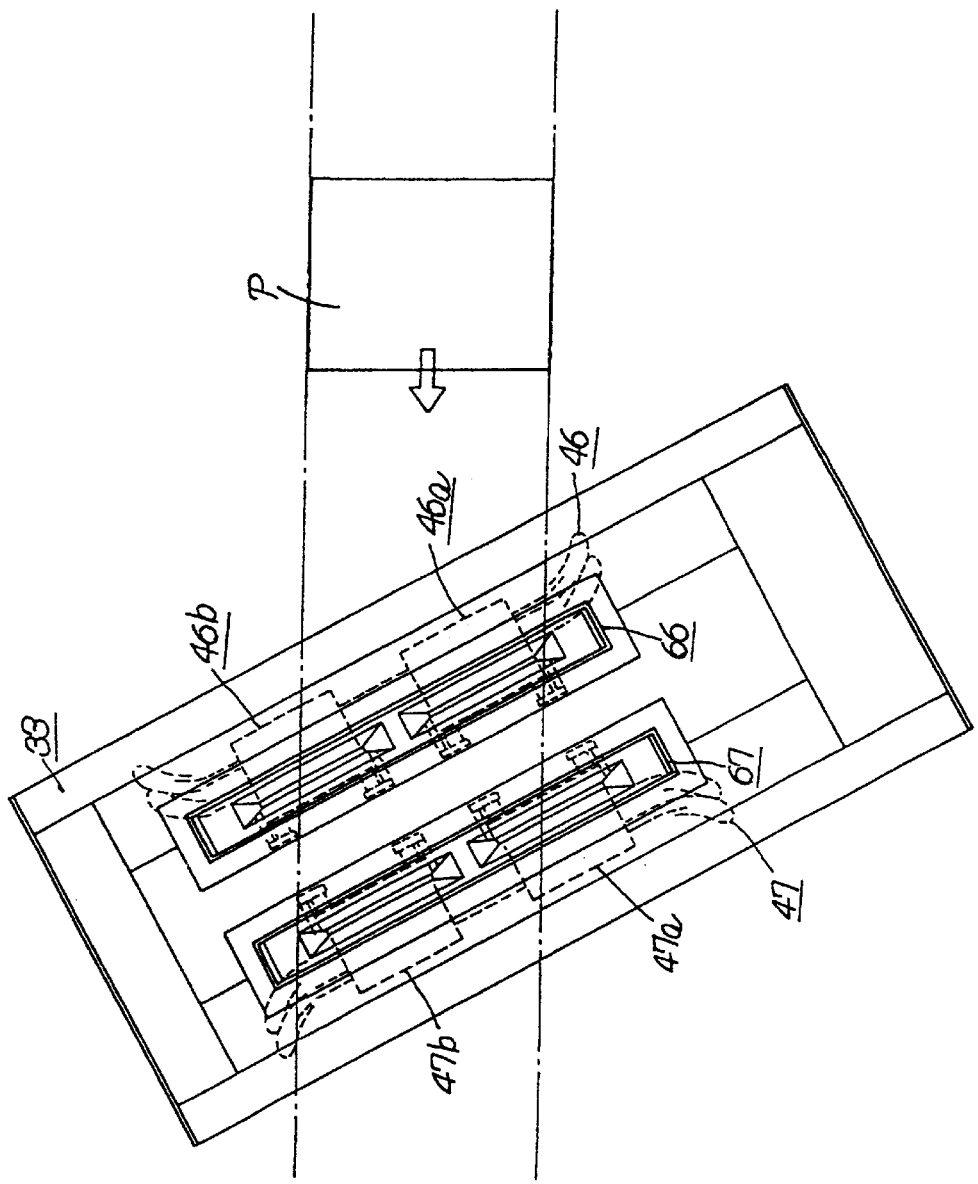
FIG. 7 is a top view of a brazing apparatus according to yet another embodiment of the invention.
Figure 8:
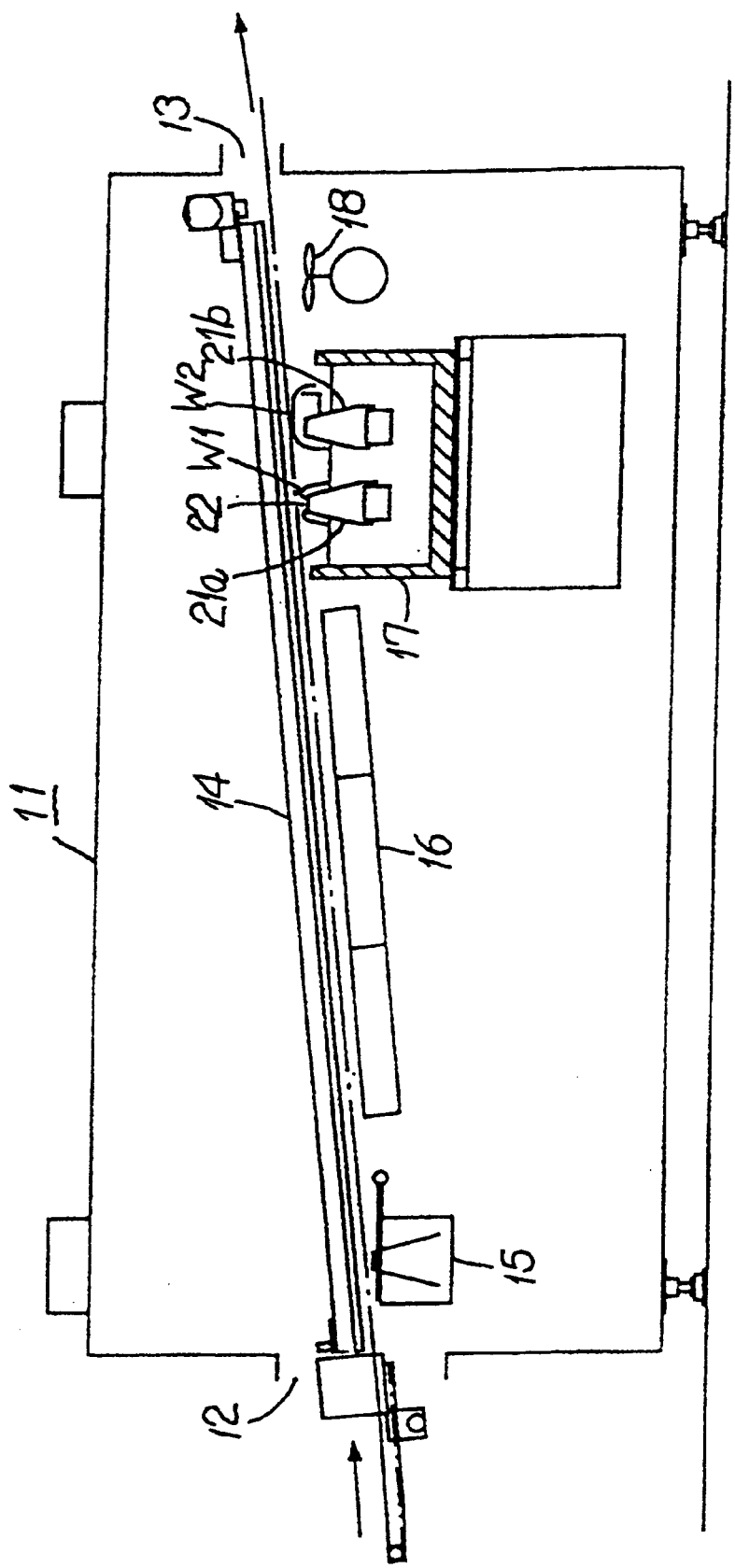
FIG. 8 is a schematic illustration of a conventional wave soldering device.
Figure 9:
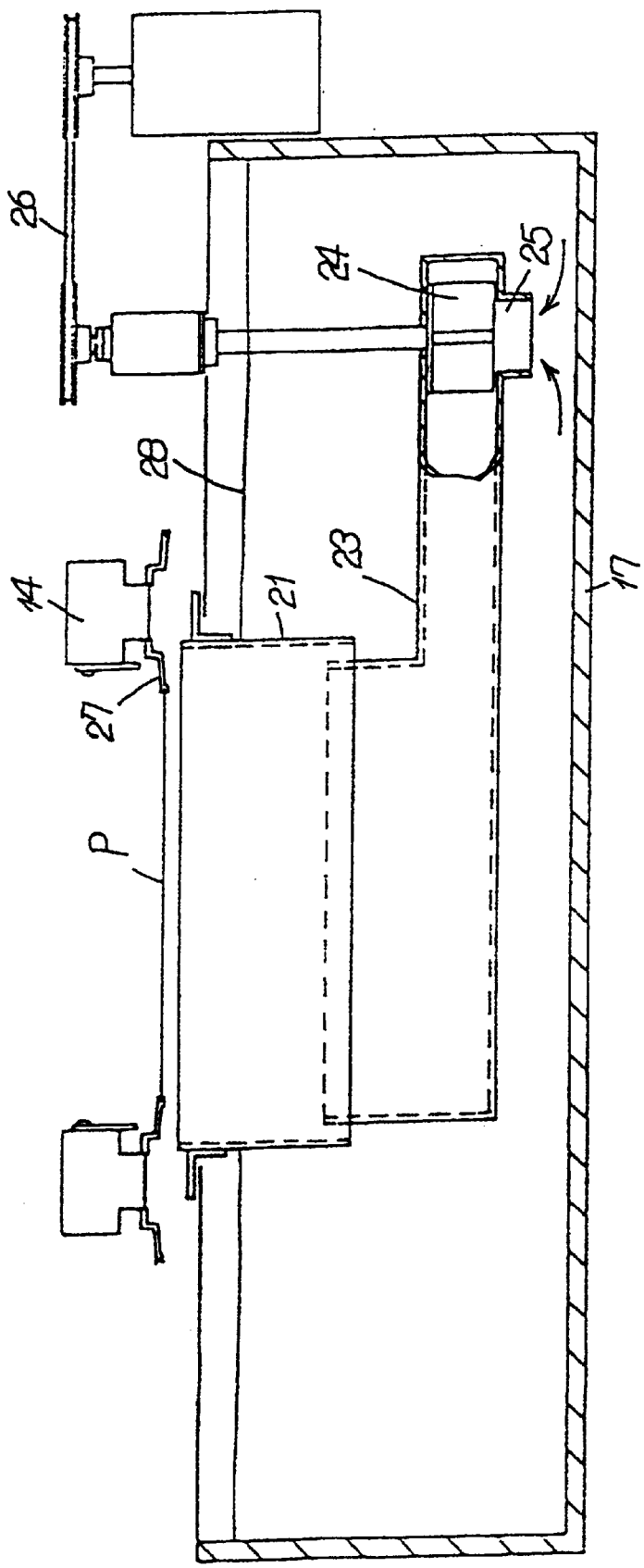
FIG. 9 is a sectional view of a solder bath of the conventional wave soldering device.

For example, also possible according to the present invention is an embodiment shown in FIG. 7, wherein the reservoir 33 is disposed in such a manner as to diagonally intersect the predetermined path of conveyance of workpieces so that the electromagnetic induction pumps 46a,46b at the workpiece inlet side and the electromagnetic induction pumps 47a,47b at the workpiece outlet side, which respectively extend along the vertical plate portion 35 at the workpiece inlet side of the reservoir 33 and the vertical plate portion 36 at the workpiece outlet side, are arranged in such a direction as to diagonally intersect the predetermined path of conveyance of workpieces.

The present invention is also applicable to a configuration wherein only one nozzle (either the first nozzle 66 or the second nozzle 67) is provided. In this case, a plurality of electromagnetic induction pumps 46,47 are arranged along either the vertical plate portion 35 at the workpiece inlet side of the reservoir 33 or the vertical plate portion 36 at the workpiece outlet side.

As a plurality of electromagnetic induction pumps 46a, 46b or 47a,47b are arranged in such a direction as to intersect the conveyance path of the workpieces as described above, waves W1,W2 which are wide enough to cover the width of workpiece and have a uniform height are ensured. In other words, the invention is capable of freely coping with workpieces having various widths and also capable of performing uniform brazing covering the entire width of workpieces even if the workpieces have a substantial width.

As the vertical plate portions 35, 36 at the workpiece inlet side and the workpiece outlet side of a single reservoir 33 are respectively provided with the first electromagnetic induction pump system 46 and the second electromagnetic induction pump system 47, the interior of the reservoir 33 can be formed compactly by disposing the vertical plate portions 35,36 at both sides close to one another. In other words, as a reservoir 33 is formed without wasting space, the quantity of the brazing filler metal in the reservoir can be reduced compared with a structure which calls for an individual reservoir for each pump system 46,47. Therefore, the invention is especially suitable for cases where an expensive brazing filler metal which contains no lead is used.

In addition, as each first iron core 52 with an induction coil 51 wound therearound is disposed outside the vertical plate portion 35 or 36 of the reservoir 33, maintenance of an induction coil 51 or a similar operation can be easily done from the outside.

In addition, by operating the electromagnetic induction pump 46a at one side together with the electromagnetic induction pump 46b at the other side or operating 47a at one side together with the electromagnetic induction pump 47b at appropriate proportions by means of a common induction coil 51, waves which are wide enough to cover the width of workpiece and have a uniform height can be easily ensured.

Furthermore, in cases where the electromagnetic induction pumps 46a,47a at the one side and the electromagnetic induction pumps 46b,47b at the other side are formed of separate first iron cores 52, second iron cores 54 and induction coils 51, energy can be saved by stopping the electromagnetic induction pumps at either side when handling workpieces which have a small width.

The present invention can be used not only for brazing chip components or the like mounted on the surface of a printed circuit board in the manner of high-density packaging with brazing filler metal which contains no lead but also for soldering components to a substrate with a soldering material containing lead.

What is claimed is:

1. A brazing apparatus comprising:
    a reservoir adapted to contain a brazing filler metal;
    vertical plate portions in said reservoir;
    a plurality of electromagnetic induction pumps;
    said plurality of electromagnetic induction pumps extending along said vertical plate portions in said reservoir; and
    said plurality of electromagnetic induction pumps being disposed to intersect a predetermined path of conveyance of said workpieces.

2. A brazing apparatus as claimed in claim 1, wherein said plurality of electromagnetic induction pumps pump brazing filler metal from a single reservoir.

3. A brazing apparatus as claimed in claim 1, wherein each electromagnetic induction pump includes:
    a first iron core disposed in close contact with an outer side face of one of said vertical plate portions;
    an induction coil wound around said first iron core;
    a second iron core disposed in parallel to an inner side face of said vertical plate portion; and
    a brazing filler metal rising gap between said vertical plate portion and said second iron core.

4. A brazing apparatus as claimed in claim 3, wherein:
each electromagnetic induction pump includes a first iron core and a second iron core; and a single induction coil is wound for common use by a plurality of first iron cores.

5. A brazing apparatus as claimed in claim 3, wherein each electromagnetic induction pump of the brazing apparatus is individually provided with a first iron core, a second iron core and an induction coil.

6. A brazing apparatus comprising:

a reservoir adapted to contain a brazing filler metal;

at least one vertical plate in said reservoir;

at least one electromagnetic induction pump;

said at least one electromagnetic induction pump including a first iron core in close contact with a first side of said vertical plate;

an induction coil on said first iron core for producing an upward force on said brazing filler metal;

a second iron core spaced from a second side of said vertical plate;

a gap between said second iron core and said vertical plate defining a brazing filler metal rising gap;

said second iron core is movable upward from said reservoir to permit maintenance access to said second iron core and an inner portion of said brazing apparatus.

7. A brazing apparatus according to claim 6, further comprising:

means for urging said first iron core into intimate contact with said first side.

8. A brazing apparatus according to claim 7, wherein said means for urging includes;

a mounting plate affixed a spaced distance from a second surface of said first iron core; and resilient means said spaced distance for urging said first iron core into contact with said first side.

9. A brazing apparatus according to claim 6, wherein said means for urging includes;

a mounting plate affixed spaced a distance from a second surface of said first iron core; and a plurality of screws threaded through said mounting plate and adjustable for urging said first iron core into contact with said first side.

10. A brazing apparatus according to claim 6, further including:

at least one spacer between said second iron core and said vertical plate;

said at least one spacer defining a dimension of said brazing filler metal rising gap;

a spring receiving plate affixed a space outward from said second iron core; and a plurality of springs urging said second iron core toward said gap, whereby a said dimension is maintained.

11. A brazing apparatus according to claim 10, wherein said springs are affixed to a surface of said second iron core, to move with said second iron core.

12. A brazing apparatus according to claim 10, wherein each of said plurality of springs is a flat V shape.

13. A brazing apparatus comprising:

at least first and second electromagnetic induction pumps disposed in a single brazing filler metal reservoir;

said first and second electromagnetic induction pumps being arranged across a width of a workpiece path;

at least third and fourth electromagnetic induction pumps disposed in said reservoir adjacent to locations of said first and second electromagnetic induction pumps; and said third and fourth electromagnetic induction pumps being arranged across said width.

14. A brazing apparatus according to claim 3, wherein:

said plurality of electromagnetic induction pumps includes at least first, second, third and fourth electromagnetic induction pumps disposed in a single brazing filler metal reservoir;

said first and second electromagnetic induction pumps arranged across a width of a workpiece path;

said third and fourth electromagnetic induction pumps are adjacent to said first and second electromagnetic induction pumps; and said third and fourth electromagnetic induction pumps are arranged across said width.

15. A brazing apparatus according to claim 8, wherein:

said at least one electromagnetic induction pump further includes at least second, third and fourth electromagnetic induction pumps disposed in a single brazing filler metal reservoir;

said first and second electromagnetic induction pumps arranged across a width of a workpiece path;

said third and fourth electromagnetic induction pumps are adjacent to said first and second electromagnetic induction pumps; and said third and fourth electromagnetic induction pumps are arranged across said width.

* * * * *